(12) United States Patent
Burleson

(10) Patent No.: US 7,100,114 B1
(45) Date of Patent: Aug. 29, 2006

(54) SYSTEM AND PROCESS FOR CREATING BOOKMARK WEB PAGES USING WEB BROWSER INTERMEDIARIES

(75) Inventor: Winslow S. Burleson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 09/732,741

(22) Filed: Dec. 11, 2000

(51) Int. Cl.
*G06F 7/08* (2006.01)
*G06F 3/01* (2006.01)
*G06F 3/048* (2006.01)

(52) U.S. Cl. .................. 715/744; 715/513; 715/738; 715/739; 715/745

(58) Field of Classification Search .................. 707/3, 707/5; 345/739, 738, 744, 745, 747, 866, 345/808; 715/738, 739, 733, 513
See application file for complete search history.

(56) References Cited

U.S. PATENT DOCUMENTS

| | | | |
|---|---|---|---|
| 5,231,494 A | 7/1993 | Wachob | |
| 5,347,632 A | 9/1994 | Filepp | |
| 5,446,891 A | 8/1995 | Kaplan et al. | |
| 5,717,923 A | 2/1998 | Dedrick | |
| 5,749,081 A | 5/1998 | Whiteis | |
| 5,918,237 A * | 6/1999 | Montalbano ................ 715/513 |
| 5,960,429 A | 9/1999 | Peercy et al. | |
| 6,334,145 B1 * | 12/2001 | Adams et al. ............... 709/217 |
| 6,460,038 B1 * | 10/2002 | Khan et al. .................. 707/10 |
| 6,483,525 B1 * | 11/2002 | Tange ......................... 345/765 |
| 6,493,702 B1 * | 12/2002 | Adar et al. .................... 707/3 |
| 6,546,393 B1 * | 4/2003 | Khan .......................... 707/10 |

* cited by examiner

*Primary Examiner*—Raymond J. Bayerl
*Assistant Examiner*—Namitha Pillai
(74) *Attorney, Agent, or Firm*—Gibb I.P. Law Firm, LLC; Daniel E. Johnson

(57) ABSTRACT

It is, therefore, an object of the present invention to provide a structure and method for a system for creating bookmarks of pages found within a network, including a graphic user interface adapted to receive a bookmark address within the network, and an automatic page creator that creates a page within the network listing the bookmark addresses. The graphic user interface includes a bookmark address input field and a comment field. The graphic user interface also includes a comment group selection menu which produces a plurality of comment classifications. The page creator creates the page to restrict access to the comment classifications. The page creator can be a web browser intermediary. The menu bar is adapted to launch the graphic user interface and the menu bar appears concurrently with a web browser.

19 Claims, 3 Drawing Sheets

SYSTEM AND PROCESS FOR CREATING BOOKMARK WEB PAGES USING WEB BROWSER INTERMEDIARIES

BACKGROUND OF THE INVENTION

1. Field of the Invention

The present invention generally relates to the Web Browser Intermediaries (WBI) and more particularly to novel applications of Web browser intermediary to the World wide Web.

2. Description of the Related Art

Web browser intermediaries (WBI) have the basic functionality of observing a stream of data (often created by a user) and using that data to modify and present the output. One commercially available WBI is Web Intermediaries, IBM Corporation, Armonk, N.Y., U.S.A. Intermediaries are computational entities that can be positioned anywhere along an information stream and are programmed to tailor, customize, personalize, or otherwise enhance data as the data flow along the stream. A caching Web proxy is a simple example of an HTTP intermediary. Intermediary-based programming is particularly useful for adding functionality to a system when the data producer (e.g., server or database) or the data consumer (e.g., browser) cannot be modified.

Thus, a WBI application can observe a user browsing the web and change pages accordingly. The WBI can suppress images, enlarge text, change the background, limit the scope of the web site, or provide the user with suggestions on links such as a red light if a link will take a long time or a green light if the link is quick. The WBI can even generate and present new links based on what the WBI observes.

WBI is an architecture and framework for creating intermediary applications on the web. WBI is a programmable web proxy and web server. The invention described below is an intermediary application within the WBI framework, using for example, Java application program interfaces.

SUMMARY OF THE INVENTION

It is, therefore, an object of the present invention to provide a structure and method for a system for creating bookmarks of pages found within a network, including a graphic user interface adapted to receive a bookmark address within the network, and an automatic page creator that creates a page within the network listing the bookmark addresses. The graphic user interface includes a bookmark address input field and a comment field. The graphic user interface also includes a comment group selection menu which produces a plurality of comment classifications. The page creator creates the page to provide access to the comment classifications. The page creator can be a web browser intermediary. The menu bar is adapted to launch the graphic user interface and the menu bar appears concurrently with a web browser.

The invention may also comprise a system for printing multiple pages found in a network, including a graphic user interface having a menu bar that includes a print command button, a page controller adapted to automatically open sub-pages linked to by a primary page, and a print controller adapted to print the primary page and the sub-pages. The page controller and the print controller are activated by a single activation of the print command button, and the menu bar appears concurrently with the Internet browser.

The network can be the Internet and the page controller opens Web pages. A level selection menu is adapted to specify a number of levels of sub-pages to be opened by the page controller.

Another embodiment comprises a method for creating bookmarks of pages found within a network including opening a network page utilizing a browser, activating a bookmark application, identifying a network address as a bookmark, and automatically creating a bookmark page on the network having the bookmark. The method may also include controlling the order of bookmarks inputting comments regarding the bookmark and associating the comments with the bookmark on the bookmark page. This method classifies the comments and provides access to the comments. The invention can create multiple bookmarks on the bookmark page, using a web browser intermediary to create the bookmark page. The step of identifying a network address can include identifying an address of the network page as a default address.

In a further embodiment, the invention comprises a method for automatically printing multiple pages found within a network including opening a network page utilizing a browser, activating a print application, automatically opening sub-pages linked to by the network page, and printing the network page and the sub-pages. The opening and the printing are performed automatically upon activating the print application. The network could be the Internet and the network page could be a web page. The sub-pages could be Web pages linked to by the network page. The invention can automatically open additional sub-pages linked to by the sub-pages. The opening and the printing could also be performed by a web browser intermediary.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

One embodiment of the invention produces virtual web pages of bookmarks. More specifically, this aspect of the invention allows a user to create a bookmark web page containing hyperlinks to other Web pages. The invention is very useful for an individual who, when surfing a network (e.g., the Internet or a local network), comes upon various pages of interest. The invention presents a graphic user interface that easily allows the user to add a web page universal resource locator (URL) hyperlink to the bookmark Web page. Therefore, with the invention, the user can research a large number of Web pages and select a small number of web pages to be maintained on the bookmark web page. Then, anyone can access the bookmark web page to review the hyperlinks collected through the efforts of the person who created the bookmark web page.

The invention has unlimited applications. For example, a teacher could create a bookmark Web page for students for general interest or classroom assignments. Additionally, a sales manager could create a bookmark web page of potential customers or products that would be utilized by salesmen to initiate sales contacts. Similarly, a researcher could create a bookmark web page that could be accessed by other researchers to stimulate progress toward the solution of a research goal. In another example, an individual could create a bookmark web page that would be of interest to members of a certain group (e.g., family members, antique collectors, skiers, librarians, etc.). As would be known by one ordinarily skilled in the art, the invention is equally applicable to any situation where a user desires to create a list of hyperlinks that need to be accessed by other users and is not limited to the foregoing examples.

Figure 1:
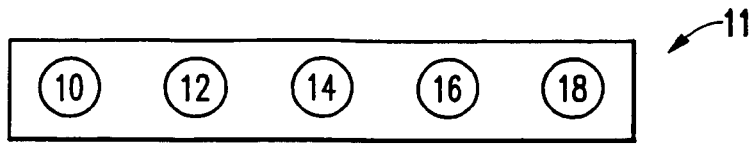
FIG. 1 is a schematic diagram of a menu bar according to the invention.

Referring now to FIG. 1, a menu bar 11 that could appear on a portion of a graphic user interface (GUI) is illustrated. The menu bar includes various buttons 10, 12, 14, 16, 18 that are selected and activated (e.g., clicked on) by a user using any conventional interface, such as a pointing device, voice control, etc. The menu bar 11 could appear anywhere on the graphic user interface and preferably remains on top of the current window to allow the user to select the bookmark web page aspect of the invention quickly and easily. For example, the menu bar 11 remains present upon the user's GUI while the user has a Web browser activated. This would allow the user to activate the invention while surfing the Web. In addition, as would be known by one ordinarily skilled in the art given this disclosure, the buttons on the menu bar 11 could include text describing the function of each button. One of the buttons 10 starts the inventive Web bookmark operation that is described below. Upon activation of the Web bookmark button 10, the user is presented with the screen 20 shown in FIG. 2. The screen 20 shown in FIG. 2 preferably comprises a small "pop-up" screen, but could occupy any portion of the user's GUI.

Figure 2:
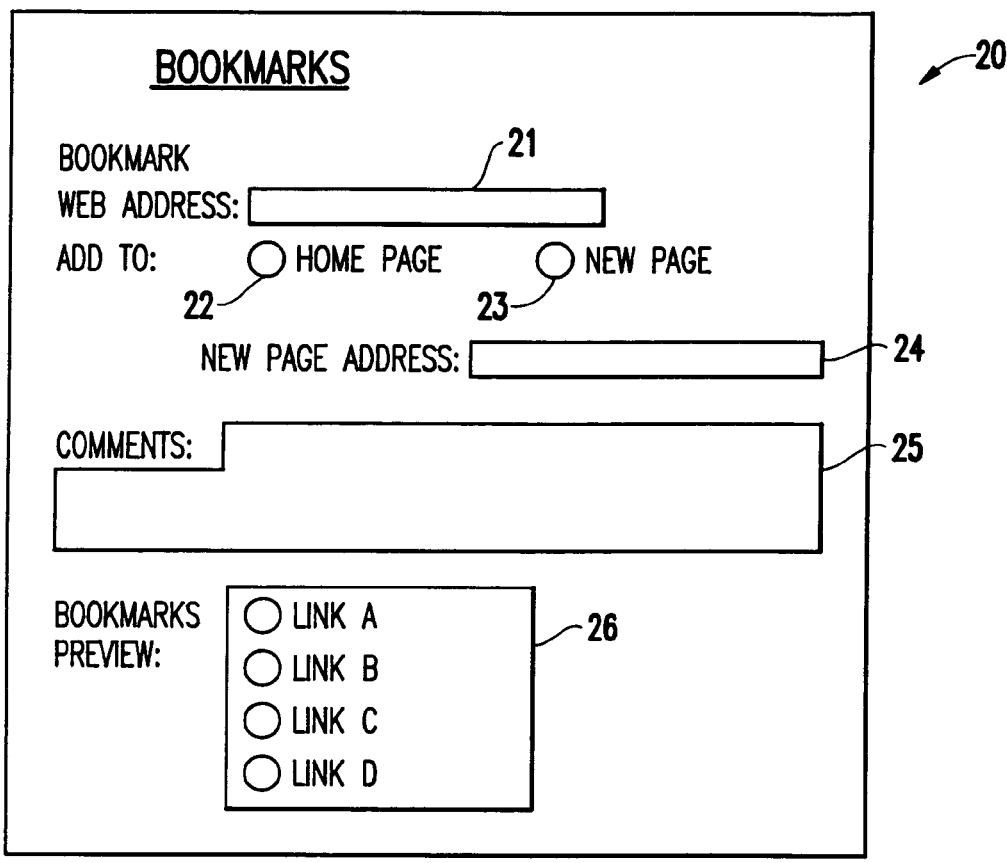
FIG. 2 is a schematic diagram of an input screen according to the invention.

The screen 20 shown in FIG. 2 includes a number of fields that gather information to create a bookmark Web page. More specifically, the URL (address) of the Web page to be added to the bookmark Web page can be input by the user in field 21. In a preferred embodiment, the invention automatically places the URL of the Web page currently active in the users Web browser in field 21 as the default address. This aspect of the invention eliminates the need for the user to type in the URL. However, the user can simply type over the default URL appearing in field 21 if a different address is to be bookmarked.

Buttons 22 and 23 allows the user to choose where the bookmark will be added. More specifically, if the user selects buttons 22, the bookmark will be added to a currently existing page (e.g., the user's home page). This currently existing page could comprise the user's main Internet home page. Alternatively, the button 22 could refer to the user's home page of bookmarks or could refer to the most recent bookmark Web page utilized by the user. As would be known by one ordinarily skilled in the art, a number of such buttons or pull down menu could be created to allow the user to select from a number of currently existing Web pages. Although not shown, an input field could allow the user to type in the URL of a currently existing Web page. The user is also allowed the option of creating a new page of bookmarks by selecting button 23 and inputting the new page address in field 24.

Figure 3:
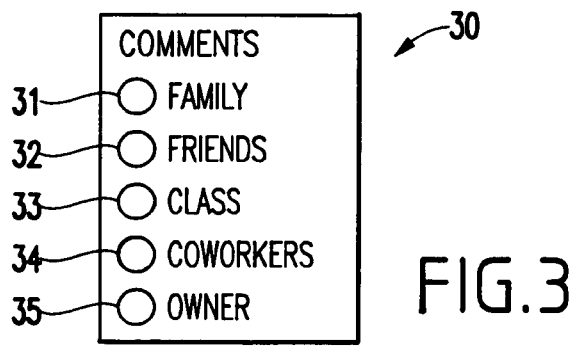
FIG. 3 is a schematic diagram of a menu bar according to the invention.

Item 25 represents a comment field where the user can provide description relating to the link that will appear on the bookmark Web page. In an additional embodiment, the invention allows the user to create different comments depending upon the group that will be reviewing the bookmark Web page. As shown in FIG. 3, the invention includes a menu bar 30 the includes buttons for family 31, friends 32, class 33, and co-workers 34. Once again, as would be known by one ordinarily skilled in the art, additional buttons can be created for additional interest groups.

When adding commentary, the user selects one or more of the buttons 31–35 and adds comments relating to each bookmark hyperlink that are appropriate to each of the individual groups. Many comments may apply to all groups. However, it may be important to provide greater detail or comments of a different nature to different groups. When another party views the bookmark Web page, they indicate whether they are a family member, friend, class member, co-worker, etc. and the invention provides commentary appropriate to that group. The users could also be distinguished on the bookmark Web page through different passwords or WBI elements taylored for classification/recognition of different groups. Therefore, for example, a teacher may provide students with one password that would produce commentary appropriate for the topical lesson, while other teachers could enter the bookmark Web page with a different password which would permit them to review different comments relating to an explanation of how the hyperlink is utilized to achieve some teaching goal.

Figure 4:
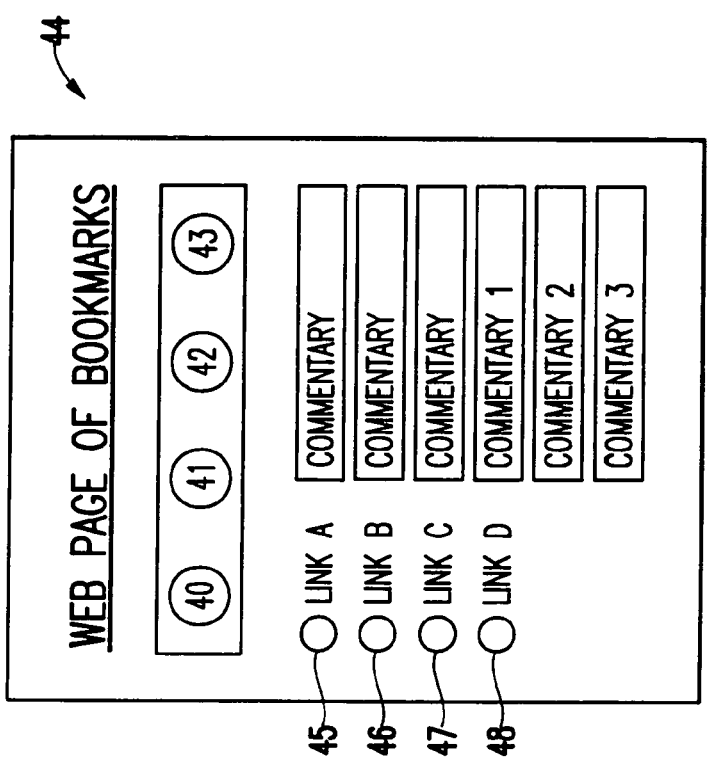
FIG. 4 is a schematic diagram of a web page produced with the invention.

In addition, the screen 20 includes a preview portion 26 that illustrates the appearance of the bookmark Web page. This preview portion 26 can be graphically edited using any common drag-and-drop formatting techniques to achieve an appearance that is desirable. The finalized bookmark Web page as it would appear to others is shown as item 44 in FIG. 4. The page 44 includes the bookmark hyperlinks 45–48 and associated commentary. Note that Link D 48 includes different commentary fields directed to different people/groups. In addition, the Web page can include different menu bars such as menu bar 49 that includes buttons 40–43 to provide similar functions as the menu bar 11 shown in FIG. 1.

Figure 5:
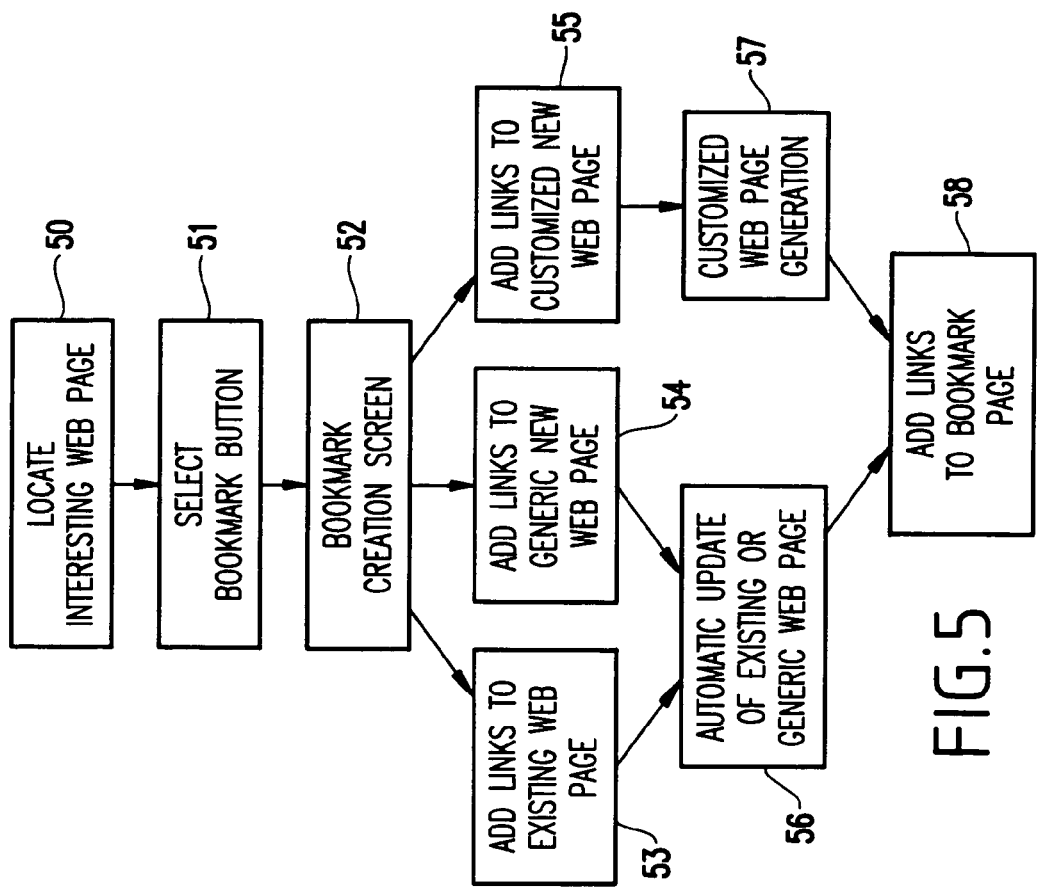
FIG. 5 is a flowchart illustrating one embodiment of the invention.

The methodology used by the invention is illustrated in flowchart form in FIG. 5. More specifically, in item 50, the user locates an interesting Web page using a conventional browser. Then, the user selects the appropriate button 10 from the menu bar 11 (shown in FIG. 1) to begin the activation of the bookmark creation portion of the invention, as shown in item 51. This causes the bookmark creation screen 20 shown in FIG. 2 to be displayed, as shown in item 52. As mentioned above, a default bookmark URL is supplied in field 21 (or the user may enter a different URL).

Items 53–55 provide the user with different options regarding the page to which the bookmark will be added. In item 53, the user can simply add the bookmark hyperlink to any existing Web page 53. Alternatively, the user can add the bookmark to a new generic Web page 54. Item 55 allows the user to add the hyperlink bookmark to a customized new Web page. Such a customized Web page can be generated with any conventionally known Web page generation application. In item 56, the existing or generic Web page is updated with the new hyperlink bookmark. Similarly, in item 57, the customized Web page is generated and updated with the new hyperlink bookmark. Finally, in item 58, the invention automatically creates graphical features such as buttons and associates appropriate commentary to provide an attractive interface for the bookmark Web page.

Therefore, with the invention, when a user (e.g., a teacher) gets to a Web page they want to add to a list for their students, the teacher simply clicks on a special bookmark button. The invention allows the teacher to add comments (which could even contain an additional link as well) about the page. The invention actually creates a page for the teacher that links these pieces of information. The bookmark page is accessible to other users, such as classroom students.

Therefore, with the invention, users can create new web pages with links and descriptions simply by surfing the Web, without having to tackle HTML or other authoring software. As discussed above, this aspect of the invention is equally applicable to salesmen, managers, and any individual making a presentation, family members, etc., who wish to make a web page of bookmark entries. Thus, the invention is not limited to the teacher/student situation described above.

In another embodiment, the invention allows a user to print all pages linked to by a given Web page. This is especially useful for printing related Web pages which concern a single topic. For example, many conferences/ papers have separate sections on separate Web pages. Indeed, one paper may have an index on one Web page with links to many Web pages, each of which contains only one chapter or section. The invention would print all Web pages linked to by the index page with a single click. Thus, with one click, the user could print the index and all pages of a conference paper without having to open and view each separate Web sub-page. This aspect of the invention avoids the current practice of having to go to each sub-page to print each page individually, which is very time intensive. Thus, the invention avoids excessive mouse pointing which can provide benefits to handdicapped, and other persons.

Figure 6:
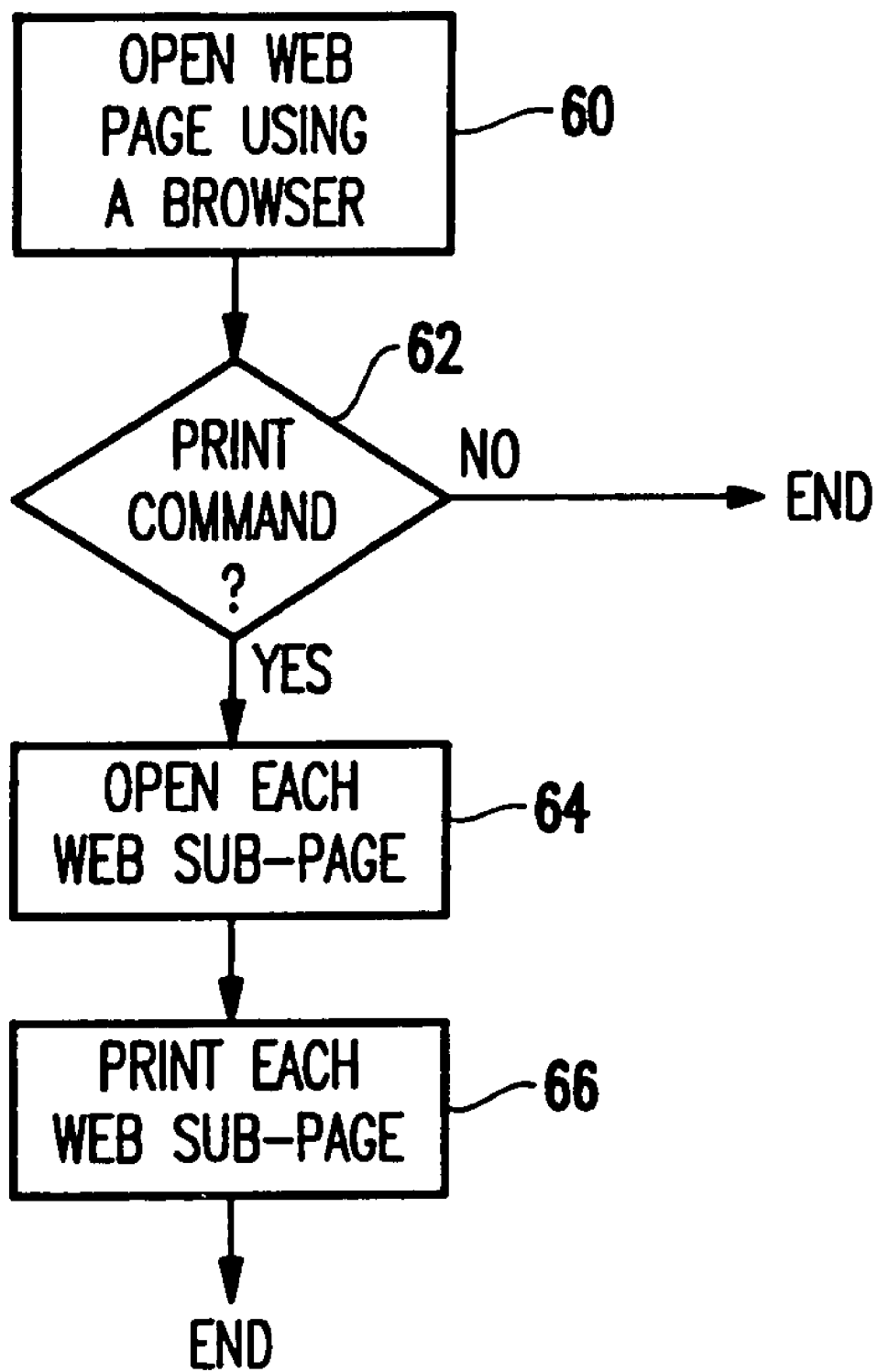
FIG. 6 is a flowchart illustrating another embodiment of the invention.

Again referring to FIG. 1, any of the buttons, such as button 12 in the menu bar 11 could comprise the print command. As illustrated in FIG. 6, the invention uses WBI to print all sub-pages linked to by a given Web page. In other words, the invention observes a main Web page and notes all hyperlinks contained therein. The invention then opens each of the hyperlinked Web pages and prints the pages.

The processing for this aspect of the invention is shown in FIG. 6. More specifically, in item 60, the user opens a Web page using any conventional browser. The user then selects the print command 12 from the menu bar 11 as shown in item 62. Then, in item 64, the invention opens each of the Web sub-pages that are linked to by the page that was viewed by the user (e.g., the primary Web page). Finally, in item 66, the invention prints each page (automaatically or manually).

In an additional embodiment of the invention, all sub-pages within each sub-page can also be printed. In other words, if a sub-page contains additional hyperlinks, those hyperlink would also be automatically opened and printed by the invention. In this embodiment, the user would previously specify or be queried as to how many levels of sub-pages should be automatically printed.

Sometimes, one or more of the sub-pages may contain links to the same page. Therefore, the invention includes a feature that allows the user to decide on the printing of duplicate Web pages. To prevent duplicate printing, the invention stores, in a file, a list of all pages that have been printed. If a page appears in the file (indicating that it has been previously printed) the invention will not automatically reprint such a page.

Therefore, the invention utilizes WBI to make networks, such as a local network or the Internet, easier and more interesting to use. The invention allows the creation of bookmark Web pages to assist individuals in preparing the results of research over the internet. In addition, the invention provides a simplified print feature to allow many Web pages to be printed at the click of a single button. Thus, the invention provides a user interface which makes computer use more simplified.

While the invention has been described in terms of preferred embodiments, those skilled in the art will recognize that the invention can be practiced with modification within the spirit and scope of the appended claims.

What is claimed is:

1. A system for creating bookmarks of pages found within a network, said pages being displayed on a browser, said system comprising:
   a graphic user interface comprising at least one button adapted to automatically add a bookmark address of a page being currently displayed on said browser and associated commentary to a public bookmark Web page, wherein said associated commentary includes different comments for different groups that will be reviewing said public bookmark Web page; and
   an automatic page creator adapted to create said public bookmark Web page.

2. The system in claim 1, wherein said graphic user interface includes:
   a bookmark address input field; and
   a comment field.

3. The system in claim 2, wherein said graphic user interface includes a comment group selection menu.

4. The system in claim 3, wherein said page creator is adapted to create said public bookmark Web page to restrict access to said different comments depending upon which password a user uses to access said public bookmark Web page.

5. The system in claim 1, wherein said page creator comprises a Web browser intermediary.

6. The system in claim 1, further comprising a menu bar adapted to launch said graphic user interface.

7. The system in claim 6, wherein said menu bar appears concurrently with a Web browser.

8. A method for creating bookmarks of pages found within a network comprising:
   open a network page utilizing a browser;
   activating a bookmark application; and
   automatically creating a bookmark of a said network page being currently displayed on said browser with associated commentary to a public bookmark Web page on said network, wherein said associated commentary includes different comments for different groups that will be reviewing said public bookmark Web page.

9. The method in claim 8, further comprising:
   inputting comments regarding said bookmark; and
   associating said comments with said bookmark on said public bookmark Web page to create said associated commentary.

10. The method in claim 9, further comprising:
    restricting access to said comments depending upon which password a user uses to access said public bookmark Web page.

11. The method in claim 8, further comprising creating multiple bookmarks on said public bookmark Web page.

12. The method in claim 8, wherein a Web browser intermediary is used to create said public bookmark Web page.

13. The method in claim 8, wherein said step of automatically creating said bookmark comprises identifying an address of said network page as a default address.

14. A program storage device readable by machine, tangibly embodying a program of instructions executable by the machine to perform a method for creating bookmarks of pages found within a network, said method comprising:
- opening a network page utilizing a browser;
- activating a bookmark application; and
- automatically creating a bookmark of said network page being currently displayed on said browser with associated commentary to a public bookmark Web page on said network, wherein said associated commentary includes different comments for different groups that will be reviewing said public bookmark Web page.

15. The program storage device as in claim 14, further comprising:
- inputting comments regarding said bookmark; and
- associating said comments with said bookmark on said public bookmark Web page to create said associated commentary.

16. The program storage device as in claim 15, further comprising:
- restricting access to said comments depending upon which password a user uses to access said public bookmark Web page.

17. The program storage device as in claim 14, further comprising creating multiple bookmarks on said bookmark page.

18. The program storage device as in claim 14, wherein a Web browser intermediary is used to create said public bookmark Web page.

19. The program storage device as in claim 14, wherein said step of automatically creating said bookmark comprises identifying an address of said network page as a default address.

* * * * *